United States Patent [19]

Nishimura

[11] Patent Number: 4,967,072
[45] Date of Patent: Oct. 30, 1990

[54] INTERFEROMETRIC ROTATING CONDITION DETECTION APPARATUS

[75] Inventor: Tetsuharu Nishimura, Kawasaki, Japan

[73] Assignee: Canon Kabushiki Kaisha, Tokyo, Japan

[21] Appl. No.: 481,684

[22] Filed: Feb. 20, 1990

Related U.S. Application Data

[63] Continuation of Ser. No. 393,104, Aug. 3, 1989, abandoned, which is a continuation of Ser. No. 315,236, Feb. 23, 1989, abandoned, which is a continuation of Ser. No. 770,753, Aug. 29, 1985, abandoned.

[30] Foreign Application Priority Data

| Sep. 5, 1984 | [JP] | Japan | 59-186170 |
| Sep. 5, 1984 | [JP] | Japan | 59-186171 |
| Sep. 5, 1984 | [JP] | Japan | 59-186172 |
| Sep. 5, 1984 | [JP] | Japan | 59-186173 |
| Sep. 10, 1984 | [JP] | Japan | 59-189154 |
| Sep. 10, 1984 | [JP] | Japan | 59-189156 |
| Sep. 10, 1984 | [JP] | Japan | 59-189157 |
| Sep. 25, 1984 | [JP] | Japan | 59-200175 |

[51] Int. Cl.$^5$ .............................. G01D 5/34
[52] U.S. Cl. .................. 250/231.16; 250/237 G; 356/356
[58] Field of Search ........ 250/231 SE, 237 G, 231.16; 324/175; 356/356; 341/13

[56] References Cited

U.S. PATENT DOCUMENTS

| 3,458,709 | 7/1969 | Beall, Jr. et al. ............. 250/231 SE |
| 3,630,622 | 12/1971 | De Lang et al. .................... 356/114 |
| 3,726,595 | 4/1973 | Matsumoto . |
| 3,738,753 | 6/1973 | Huntley, Jr. . |
| 3,756,723 | 9/1973 | Hock ............................... 250/237 G |
| 3,891,321 | 6/1975 | Hock ................................... 356/356 |
| 4,676,645 | 6/1987 | Taniguchi et al. .................. 356/356 |

FOREIGN PATENT DOCUMENTS

| 1169150 | 4/1964 | Fed. Rep. of Germany . |
| 5074 | 2/1972 | Japan . |
| 207805 | 6/1981 | Japan . |
| 190202 | 11/1982 | Japan . |
| 190203 | 11/1982 | Japan . |
| 58-191906 | 11/1983 | Japan . |
| 58-191907 | 11/1983 | Japan . |
| 1287462 | 8/1972 | United Kingdom . |

Primary Examiner—David C. Nelms
Assistant Examiner—Shami, Khaled
Attorney, Agent, or Firm—Fitzpatrick, Cella, Harper & Scinto

[57] ABSTRACT

A rotating condition detection apparatus includes a light source for illuminating a radial lattice having a plurality of lattice patterns marked on a periphery of a rotating body at an equi-angle; an optical unit for superimposing two refraction lights having a predetermined number of order reflected in two predetermined directions by the radial lattice; a photosensing device for sensing the superimposed light; and a detector for detecting a rotating condition of the rotating body in accordance with the output of the photosensing means.

44 Claims, 10 Drawing Sheets

FIG. 6A
FIG. 6B
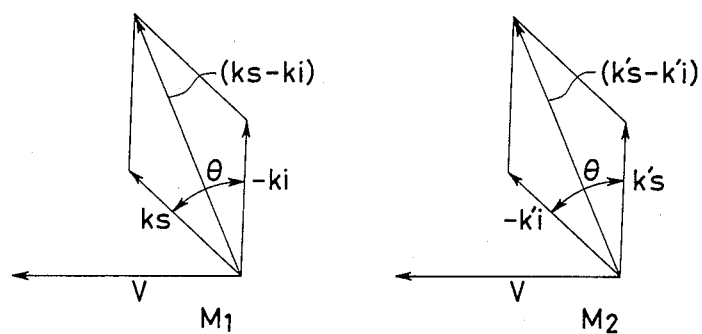
FIG. 7
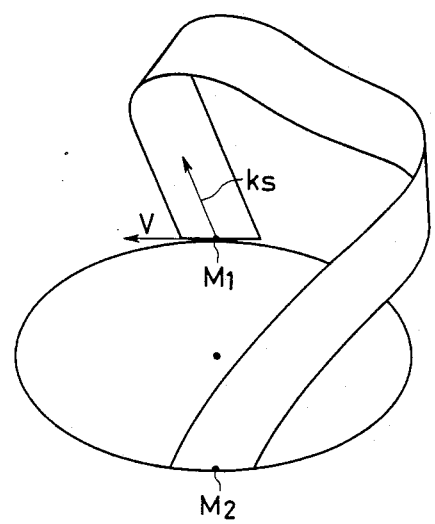

INTERFEROMETRIC ROTATING CONDITION DETECTION APPARATUS

This application is continuation of application Ser. No. 07/393,104 filed Aug. 3, 1989, which is a continuation of application Ser. No. 07/315,236 filed Feb. 23, 1989, which is a continuation of application Ser. No. 06/770,753 filed Aug. 29, 1985, all of which are now abandoned.

BACKGROUND OF THE INVENTION

1. Field of the Invention

The present invention relates to an apparatus for detecting a rotating condition of an article, and more particularly to an apparatus for detecting a rotating condition of an article by applying a lattice pattern formed in a predetermined pattern to the article, applying a light beam from a laser to the lattice pattern and detecting the pattern by a diffraction light from the lattice pattern.

2. Description of the Prior Art

Rotary encoder, rotation meter and linear scale have been known as the apparatus for detecting the rotating condition of the article. Recently, a demand for an apparatus which detects the rotating motion of the article at a high precision has been increasing. The rotary encoder uses a method of optically detecting the rotating condition of the rotating article.

In the prior art photoelectric rotary encoder, a main scale having equi-spaced light transmission areas and light blocking areas formed in a periphery of a disk coupled to a rotating shaft and a stationary index scale having light transmission areas and light blocking areas at the same pitch as those of the main scale are opposingly arranged between light projection means and light sensing means to form an index scale system. In this system, as the main scale is rotated, signals corresponding to the spacing between the light transmission area and the light blocking area of the scale are produced and the signals are frequency-analyzed or accumulated after reshaping to detect a rotation angle, variation in a rotation speed or a rotation direction.

In such a rotary encoder, the narrower the spacing between the light transmission area and the light blocking area of the scale is, the higher is the detection precision. However, as the spacing is reduced, an S/N ratio of the output signal from the photosensing means is decreased and the detection precision is lowered by virtue of diffraction of the light. If the total number of the light transmission areas and the light blocking areas of the main scale is fixed and the spacing between the light transmission area and the light blocking area is increased to such an extent that the affect by the diffracted light is avoided, a diameter of the main scale must be increased and a thickness must also be increased. As a result, the apparatus is of big size and a load to the rotating article under test increases.

SUMMARY OF THE INVENTION

It is an object of the present invention to provide a moving condition detection apparatus which reduces a load to a moving article under test and is compact and can detect the moving condition at a high precision.

It is another object of the present invention to provide an apparatus for detecting a rotating condition of a rotating article which reduces a load to the rotating article under test, reduces affect of eccentric mounting to the rotating article is compact and can detect a rotation angle or a rotating speed at a high precision.

It is another object of the present invention to provide a high precision apparatus for detecting a rotating condition of a rotating article which can reduce a measurement error due to a lattice pattern error of a radial lattice or a variation of an output level from a light source.

It is another object of the present invention to provide a rotating condition detection apparatus comprising:
a light source for illuminating a radial lattice having a plurality of lattice patterns marked on a periphery of a rotating body at an equi-angle;
optical means for superimposing two diffraction lights having a predetermined number of order reflected in two predetermined directions by the radial lattice;
photosensing means for sensing the superimposed light; and
means for detecting a rotating condition of the rotating body in accordance with the output of said photosensing means.

It is another object of the present invention to provide a rotating condition detection apparatus comprising:
a light source for illuminating a radial lattice having a plurality of lattice patterns formed in a periphery of a rotating body at an equi-angle;
first light splitting means for splitting a light beam from said light source into two light beams;
first optical means for directing the two split light beams to said radial lattice at a predetermined angle and superimposing two diffraction lights having a predetermined number of order reflected by said radial lattice;
photosensing means for sensing the superimposed light beam; and
means for detecting a rotating condition of the rotating body in accordance with the output of said photosensing means.

It is another object of the present invention to provide a rotating condition detection apparatus comprising:
a light source for illuminating a radial lattice having a plurality of lattice patterns formed in a periphery of a rotating body at an equi-angle;
first optical means for redirecting two diffraction lights having a predetermined number of order reflected by or transmitted through the radial lattice and superimposing the two refraction lights;
photosensing means for sensing the superimposed light; and
means for detecting a rotating condition of the radial lattice or the rotating body carrying the radial lattice thereon in accordance with the output signal from said photosensing means.

BRIEF DESCRIPTION OF THE DRAWINGS

FIGS. 6A and 6B show vector representations of an incident light beam and a diffraction refraction light in the seventh embodiment, and FIG. 7 shows focusing relationship between incident points $M_1$ and $M_2$ in the seventh embodiment.

DETAILED DESCRIPTION OF THE PREFERRED EMBODIMENTS

Figure 1A:
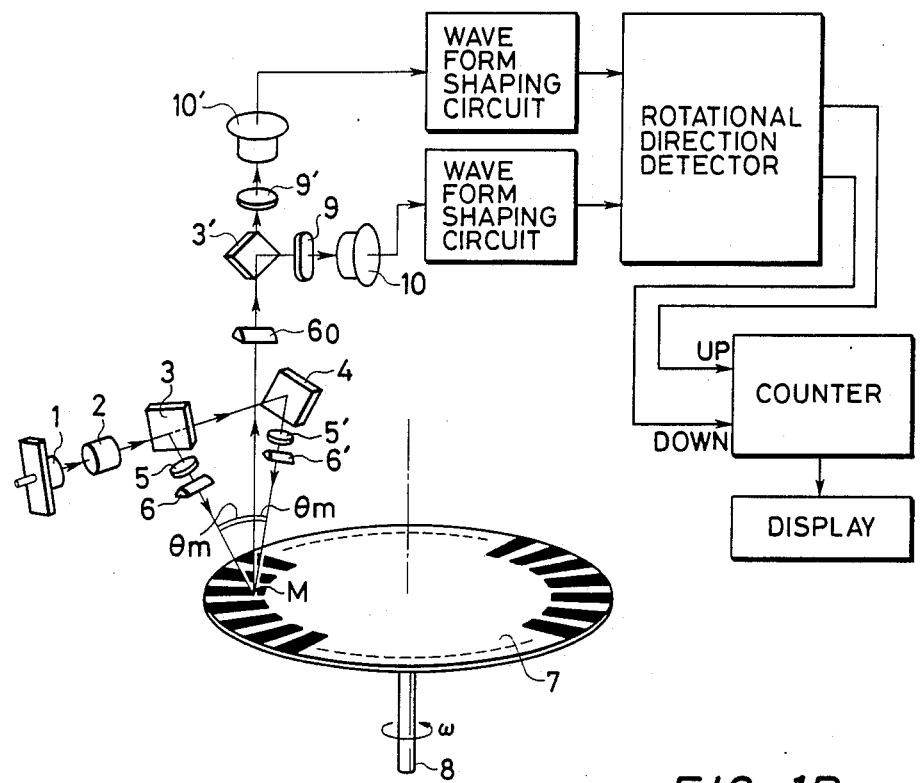
FIGS. 1A, 1B, 1C, 1D, 1E, and 1F show first, third, fifth and seventh embodiments of the present embodiments and modifications thereof.

The present invention applied to a rotary encoder is described.

FIG. 1 shows a first embodiment of the present invention. Numeral 1 denotes a light source such as a laser, numeral 2 denotes a collimeter lens, numerals 3 and 3' denote light split means such as beam splitters, numeral 4 denotes a reflection mirror, numerals 5 and 5' denotes a quarter wavelength plates arranged at 45° and −45° to a linearly polarized light of the laser 1, numerals $6_0$, 6 and 6' denote cylindrical lenses, numeral 7 denotes a radial lattice of light transmission areas and light blocking areas arranged at equi-angle on a disk, numeral 8 denotes a rotating shaft of the radial lattice 7 connected to a rotating shaft of the rotating article under test, numerals 9 and 9' denote polarization plates having polarization axes staggered by 45° from each other, and numerals 10 and 10' denote photosensing devices.

The light beam emitted from the laser 1 is collimated by the collimeter lens 2 and split into two light beams by the beam splitter 3.

The reflected light beam passes through the quarter wavelength plate 5, and the cylindrical lens 6 and linearly illuminates the radial lattice 7 at an incident angle of $\theta m$ in a direction normal to the radial direction of the lattice pattern of the radial lattice 7. Through this linear illumination, a pitch error of the lattice pattern of the light transmission area and the reflection area corresponding to the illumination area on the radial lattice 7 is reduced. The cylindrical lens may be replaced by a slit or a lens and a slit to present a linear illumination.

The reason for the reduction of the pitch error by such linear illumination is as follows. If the light is illuminated by a beam spot, the diffracted light is not a beam spot beam because the width of the light transmission area and the light blocking area reduces as they go toward the center of rotation, and hence an error is produced.

The light beam transmitted through the beam splitter 3 is reflected by the reflection mirror 4, passes through the quarter wavelength plate 5' and the cylindrical lens 6', and linearly illuminates the radial lattice 7 at an incident angle of $-\theta m$. The incident angle $\theta m$ is selected to meet the +m-order refraction condition expressed by $$\sin \theta m = \pm m\lambda/p \quad (1)$$

where m is a positive integer, $\lambda$ is the wavelength of the laser and p is the pitch of the light transmission area and the reflection area at the illumination point M on the radial lattice 7. When two light beams are applied at the angles defined by the formula (1), ±m-order diffraction lights of the diffraction lights reflected at the illumination point M are superimposed and reflected normally to the radial lattice surface. It passes through the cylindrical lens $6_0$ and is collimated, and the collimated light beam is divided into two light beams by the beam splitter 3'. The two light beams pass through the polarization plates 9 and 9' and are directed to the photosensing devices 10 and 10'.

Let us assume that the radial lattice 7 is rotating at an angular velocity of $\omega$. A peripheral velocity of the illumination point M is $v = \gamma\omega$ where $\gamma$ is a distance from the center of rotation of the radial lattice to the illumination point M. The frequency of the laser beam directed to the illumination point M at the angle $\theta m$ and normally reflected is subjected to a doppler shift $\Delta f$ represented by $$\Delta f = V \sin \theta m/\gamma = \gamma\omega \sin \theta m \quad (2)$$

From the diffraction condition of the formula (1), $$\Delta f = \pm m\gamma\omega/p$$

If the total number of the lattice patterns of the radial lattice 7 is N and the equi-angle pitch of the lattice pattern is $\Delta\phi$, then $p = \Delta\phi$ and $\Delta\phi = 2\pi/N$. Thus, $$\Delta f = \pm m\gamma/\Delta\phi = \pm mN\omega/2\pi \quad (3)$$

Since the light beam diffracted and diffracted normally to the radial lattice 7 at the illumination position M is the superposition of the light beams which had positive and negative doppler frequency shifts of the formula (3), the frequency F of the output signals of the photosensing devices 10 and 10' is $$F = 2\Delta f = mN\omega/\pi \quad (4)$$

If the number of waves of the output signals of the photosensing devices 10 and 10' in the time period $\Delta t$ is n, and a rotation angle of the radial lattice 7 in the time period $\Delta t$ is $\theta$, then $n = F \cdot \Delta t$ and $\theta = \omega \cdot \Delta t$. Thus, $$n = mN\theta/\pi \cdot \quad (5)$$

Thus, by counting the number of waves of the output signal of the photosensing device, the rotation angle $\theta$ of the radial lattice 7 can be determined from the formula (5).

When the rotation angle is measured, it is preferable if the direction of rotation can be detected. In the first embodiment, as is known in the prior art photoelectrical rotary encoder, a plurality of photosensing devices are arranged with the phases of signal being staggered by 90° from each other to extract a signal representing the direction of rotation. In the present embodiment, the 90° phase shift between the output signals of the photosensing devices 10 and 10' is created by the combination of the linear polarization of the laser, the quarter wavelength plate and the polarization plate. The laser is usually linearly polarized. Two quarter wavelength plates 5 and 5' are arranged in the direction of polarization at angles of 45°. Thus, the light beams transmitted through the quarter wavelength plates 5 and 5' are circularly polarized in the opposite directions to each other, and when they are superimposed at the illumination point M, they are again linearly polarized but the polarization directions vary with the rotation of the radial lattice 7. By staggering the polarization directions of the polarization plates 9 and 9' arranged on the photosensing devices 10 and 10' by 45° from each other, the phase difference of 90° is imparted to the output signals of the photosensing devices 10 and 10'. As shown in FIG. 1, the output signals of the photosensing devices 10 and 10' are reshaped and the direction of rotation is detected, and they are accumulated by the counter to determine the rotation angle. In the prior art index scale type photoelectric rotary encoder, the number n of waves of the output signal from the photosensing device, the total number N of lattice patterns of the main scale and the rotation angle $\theta$ have a relationship of $$n = N\theta/2\pi \quad (6)$$

Accordingly, the rotation angle $\Delta\theta$ per wave is $$\Delta\theta = 2\pi/N \text{ (radian)} \quad (7)$$

On the other hand, in the present embodiment, $$\Delta\theta = \pi/mN \text{ (radian)} \quad (8)$$

as seen from the formula (5). Accordingly, the first embodiment can detect the rotation angle at the precision of 2m times that of the prior art with the same number of division of the scale.

In the first embodiment, the light from the light source is divided into two light beams, which are directed to the radial lattice and the diffraction lights therefrom are superimposed. Alternatively, the light from the light source may be directed to the radial lattice and two diffraction lights reflected in two predetermined directions may be superimposed. In this case, the light source is arranged at the position of the photosensing device 10' of FIG. 1A, and the photosensing device is arranged at the position of the light source 1.

In the above embodiment, the doppler shift is effected only one time. It may be effected twice in order to enhance the detection precision.

Figure 2A:
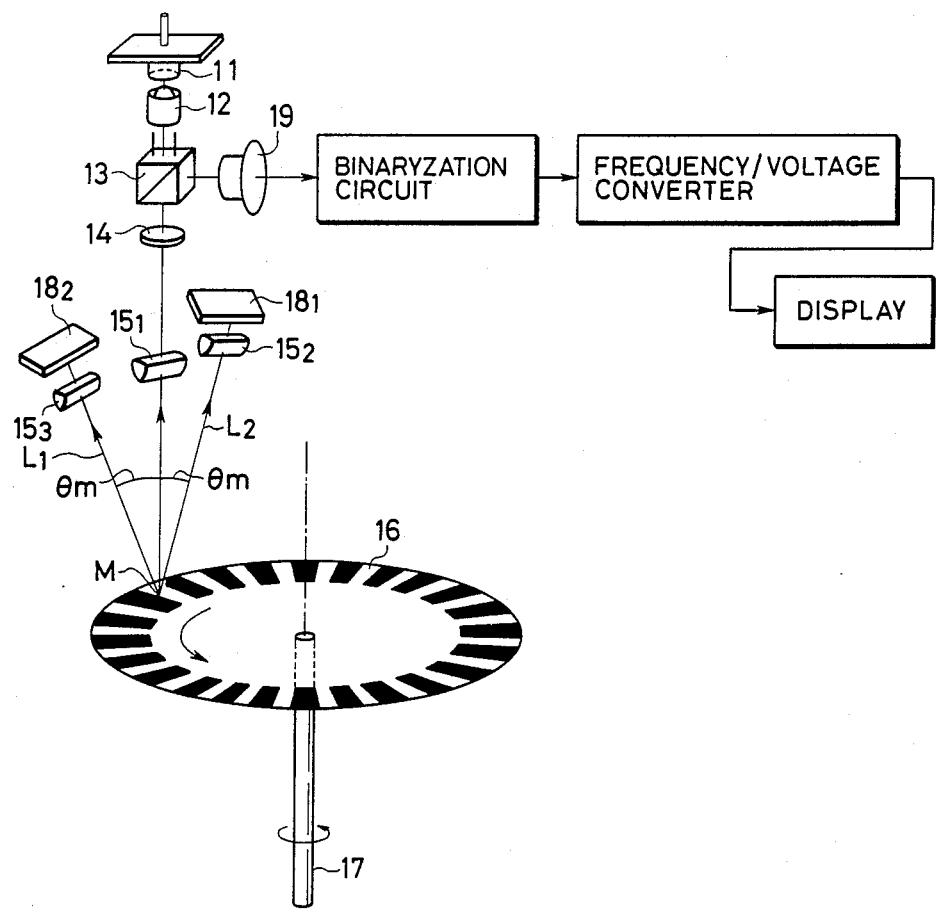
FIGS. 2A, 2B, 2C, 2D, 2E, 2F, 2G, and 2H show second, fourth, sixth and eighth embodiment of the present invention and modifications thereof.

A second embodiment of the present invention is shown in FIG. 2A. In the second embodiment, a variation of a rotating speed of a rotating body is determined. Numeral 11 denotes a light source such as a laser, numeral 12 denotes a collimeter lens, numeral 13 denotes a polarization beam splitter, numeral 14 denotes a quarter wavelength plate, numerals $15_1$–$15_3$ denote cylindrical lenses, numeral 16 denotes a radial lattice having a lattice pattern of light transmission areas and light blocking areas arranged at equi-angle on a disk, numeral 17 denotes a rotating shaft coupled to a rotating body under test, numerals $18_1$ and $18_2$ denote reflection mirrors, and numeral 19 denotes a photosensing device.

The linearly polarized light beam emitted from the laser 11 is collimated by the collimeter lens 12, passes through the polarization beam splitter 13 and the quarter wavelength plate 14 and is circularly polarized, and it linearly illuminates the radial lattice 16 through the cylindrical lens $15_1$. The cylindrical lens $15_1$ is arranged such that the linear illumination takes place in the direction normal to the lattice pattern of the radial lattice 16, that is, tangentially of the radial lattice 16.

The light beam from the laser 11 is reflected and diffracted by the lattice pattern of the radial lattice 16. If a pitch of the light transmission area and the light blocking area at the illumination position M of the light beam is given by P, a refraction angle $\theta m$ of $\pm m$-order reflected refraction lights $L_1$ and $L_2$ is given by $$\sin\theta m = m\lambda/p \quad (9)$$

where $\lambda$ is a wavelength of the light beam. When a peripheral velocity of the radial lattice 16 at the illumination point M is given by v, a frequency of the $\pm m$-order diffraction refraction lights $L_1$ and $L_2$ is subjected to a doppler shift by $$\Delta f = \pm V \sin\theta m/\lambda \quad (10)$$

The $\pm m$-order reflected diffraction lights $L_1$ and $L_2$ pass through the cylindrical lenses $15_2$ and $15_3$, are reflected by the reflection mirrors $18_1$ and $18_2$, return to the original light path, diffracted again by the lattice pattern of the radial lattice 16 and are reflected as the $\pm m$-order refraction lights, which are superimposed and return to the original light path. Since they are again subjected to the doppler shift of the formula (2), the total doppler shift of the $\pm m$-order diffraction lights $L_1$ and $L_2$ is equal to $\pm 2\Delta f$. It again passes through the quarter wavelength plate 14 so that the circular polarized beam is converted to the linear polarized beam polarized normal to the exit light of the laser 11, and it is reflected by the polarization beam splitter 13 and sensed by the photosensing device 19.

Since the light beams subjected to the $\pm m$-order diffraction twice are directed to the photosensing device 19 in superposition, the frequency F of the output signal of the photosensing device 19 is $$\begin{aligned} F &= 2\Delta f - (-2\Delta f) \\ &= 4\Delta f \\ &= 4v\sin\theta m/\lambda \end{aligned}$$

From the diffraction condition of the formula (9), the frequency F of the output signal is $$F = 4mv/p$$

When a rotating angular velocity is given by $\omega$, a rotation frequency of the rotating shaft 7 is given by f, a pitch of the equi-angle lattice of the radial lattice 16 is given by $\Delta\phi$, the number of division (total number) of lattices of the light transmission areas and the light blocking areas is given by N and a radius of the laser at the illumination position M is given by $\gamma$, then $v = \gamma f$, $\omega = 2\pi f$, $p = Y\Delta\phi$ and $\Delta\phi = 2\pi/N$. Accordingly, the frequency F of the output signal of the photosensing device is $$F = 4mNf \quad (11)$$

which is represented by the order m of diffraction, the number of division N and the rotation frequency f. As shown in FIG. 2A, the output signal from the photosensing device 9 is binarized by a comparator, frequency-analyzed by a frequency-voltage converter, and a result thereof is displayed to determine the frequency F and the variation of the rotating speed of the rotating body.

In the prior art index scale type photoelectric rotary encoder, a frequency F' of the output signal from the photosensing device is $$F' = NF$$

Accordingly, the frequency in the present embodiment is 4m times as high as that of the prior art and the variation detection precision of the rotating speed is improved by the factor of 4m.

Figure 1B:
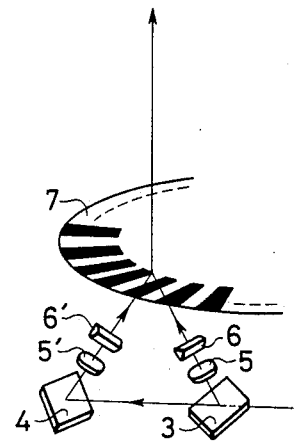

FIG. 1B shows a portion of a modification of the first embodiment of the present invention. FIG. 1B shows the area of the radial lattice 7 of FIG. 1A at which the light beam is impinged. The like numerals to those shown in FIG. 1A denote the like elements. In FIG. 1B, the ±m-order transmitted diffraction lights of the light beam impinged to the radial lattice 7 are utilized. The application shown in FIG. 1B and the first embodiment shown in FIG. 1A are basically identical except that the former uses the m-order transmitted refraction light while the latter use the m-order reflected refraction light.

Figure 2B:
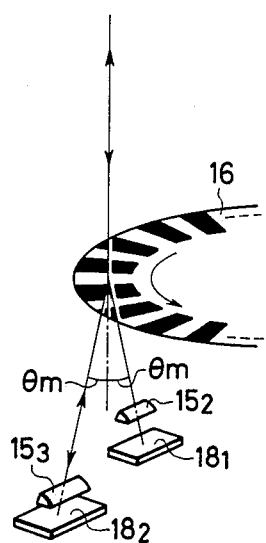
Figure 2C:
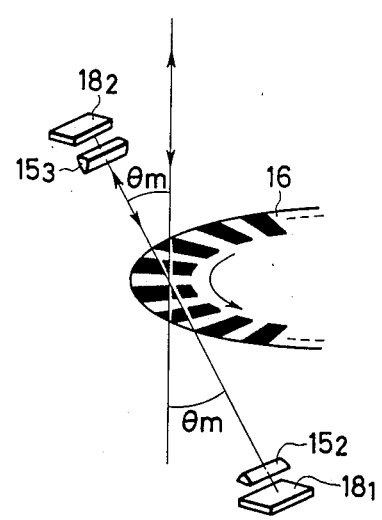

FIGS. 2B and 2C show portions of modifications of the second embodiment. FIGS. 2B and 2C shows areas of the radial lattices 16 to which the light beams are impinged. The like numerals to those shown in FIG. 2A denote the like elements. In FIG. 2B, the ±m-order transmitted diffraction lights of the light beam impinged to the radial lattice 16 are utilized, and in FIG. 2C, the m-order transmitted diffraction light and the m-order reflected diffraction light of the light beam impinged to the radial lattice 16 are utilized. Both embodiments are basically identical to the embodiment of FIG. 2A except that the ±m-order transmitted diffraction lights or the m-order transmitted diffraction light and the m-order reflected diffraction light are used instead of the ±m-order reflected diffraction lights.

Figure 1C:
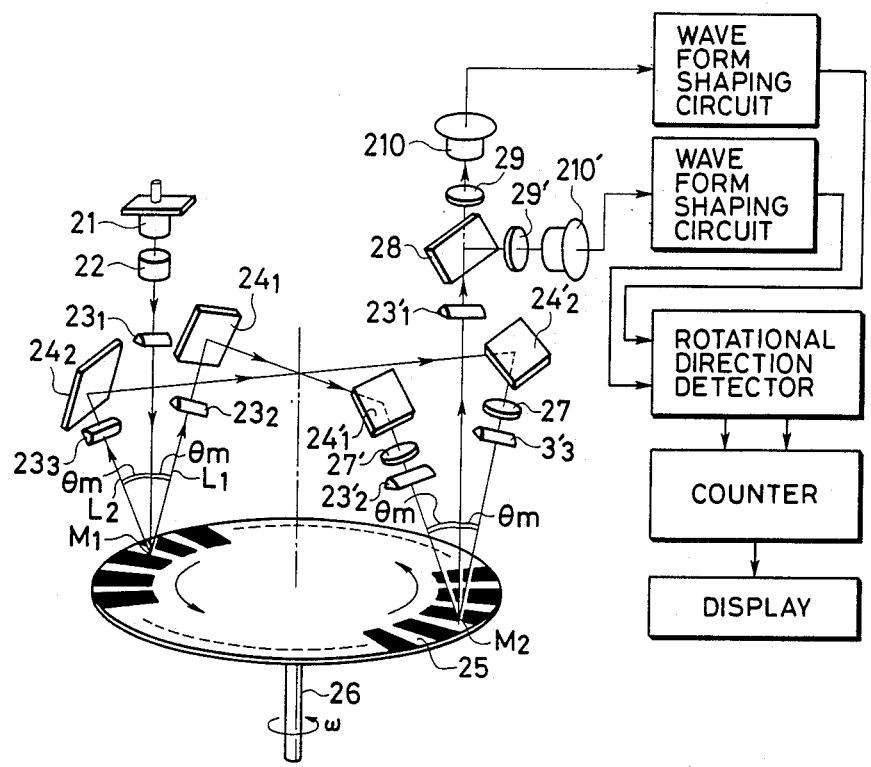
Figure 2D:
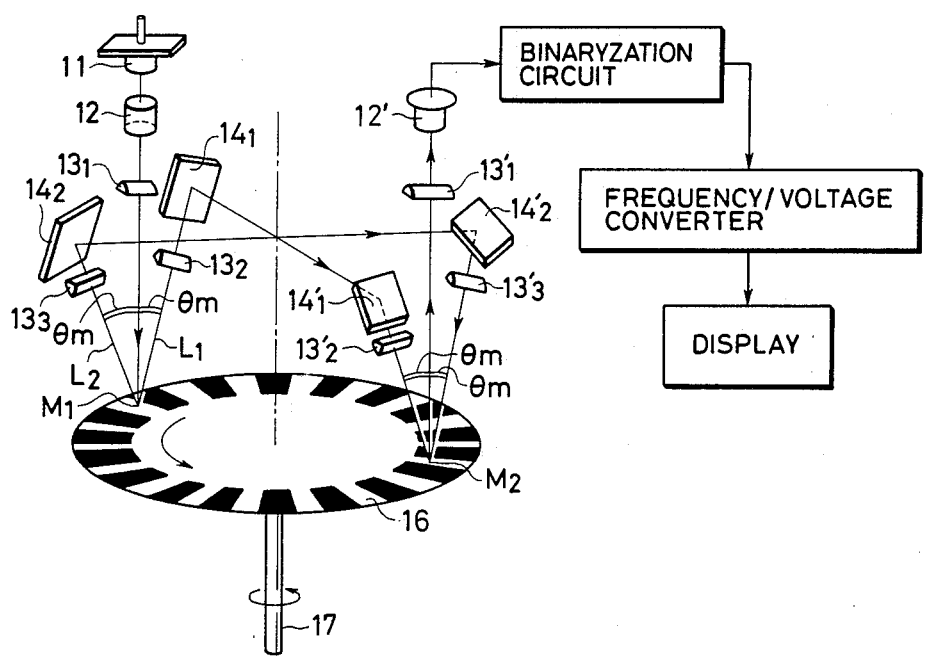

In the second embodiment, in order to enhance the rotation angle detection precision and the rotation speed variation detection precision, the number of times of superposition of the diffraction lights may be increased. By superimposing the diffraction lights at two positions, the eccentricity of mounting of the scale to the rotating body can be eliminated. FIGS. 1C and 2D show apparatus which superimpose the diffraction lights twice at two positions. FIG. 1C shows a third embodiment of the present invention, which is a modification of the first embodiment.

In FIG. 1C, numeral 21 denotes a light source such as a laser, numeral 22 denotes a collimeter lens, numerals $23_1$-$23_3$ and $23_1'$-$23_3'$ denote cylindrical lenses, numerals $24_1$, $24_2$, $24_1'$ and $24_2'$ denote reflection mirrors, numeral 25 denotes a radial lattice having light transmission areas and light reflection areas formed on a disk at an equi-angle, numeral 26 denotes a rotating shaft of a rotating body under test, numerals 27 and 27' denote quarter wavelength plates arranged at 45° and −45° to a linear polarization light of the light beam from the laser 21, numeral 28 denotes a beam splitter, numerals 29 and 29' denote polarization plates arranged to have polarization angle of 45° to each other, and numerals 210 and 210' denote photosensing devices.

The doppler shift of the diffraction lights takes place at two positions $M_1$ and $M_2$. A principle of operation is described below.

The light beam from the laser 21 is reflected and diffracted by the lattice pattern of the radial lattice 25. When a pitch of the lattice pattern at the illumination position $M_1$ of the light beam is given by p, a diffraction angle $\theta m$ of the ±m-order reflected diffraction lights $L_1$ and $L_2$ is given by $$\sin \theta m = \pm m\lambda/p \qquad (12)$$

where $\lambda$ is a wavelength of the light beam.

Let us assume that the radial lattice 25 is rotating at an angular velocity of $\omega$. When a distance from a center of rotation of the radial lattice to the illumination position $M_1$ is given by $\gamma$, a peripheral velocity at the illumination point $M_1$ is $v = \gamma\omega$. The frequency of the ±m-order reflected diffraction lights is subjected to the doppler shift by $$\Delta f = \pm v \sin \theta m/\lambda = \pm \gamma\omega \sin \theta m/\lambda \qquad (13)$$

The ±m-order reflected diffraction lights are directed to the position $M_2$ which is point-symmetric to the center of rotation by the reflection mirrors $24_1$ and $24_2$ through the cylindrical lenses $23_2$ and $23_3$, and linearly directed through the reflection mirrors $24_1'$ and $24_2'$, the quarter wavelength plates 27 and 27' and the cylindrical lenses $23_2'$ and $23_3'$. The quarter wavelength plates 27 and 27' are arranged at 45° and −45° to the direction of the linear polarization of the incident laser beam. The reflection mirrors $24_1'$ and $24_2'$ are arranged such that the incident angle to the illumination position $M_2$ is equal to the reflected diffraction angle $\theta m$ at the illumination position $M_1$ and the angle to the peripheral direction of the radial lattice 25 at $M_1$ is equal to the angle to the peripheral direction at $M_2$. Thus, the ±m-order reflected diffraction lights are superimposed at the illumination position, pass through the cylindrical lens $23_1'$ and are again collimated, and the collimated light is divided into two light beams by the beam splitter 28, and they pass through the polarization plates 29 and 29' and are directed to the photosensing devices 210 and 210'. As the radial lattice 25 rotates, the ±m-order diffraction lights reflected at the illumination position $M_2$ and superimposed are again subjected to the doppler frequency shift $\Delta f$ in accordance with the formula (13). Thus, in addition to the frequency shift subjected at the illumination position $M_1$, the ±m-order diffraction lights reflected at the illumination position $M_2$ are subjected to the frequency shift and the total frequency shift is equal to ±2f. Since the lights subjected to the ±m-order diffraction twice are superimposed, the frequency of the output signals of the photosensing devices 210 and 210' is equal to $2\Delta f - (-2\Delta f) = 4\Delta f$. Thus, the frequency F of the output signals of the photosensing devices 10 and 10' is $F = 4\Delta f = 4\gamma\omega \sin \theta m/\lambda$. From the diffraction condition of the formula (12), $F = 4m\gamma\omega/p$. When the total number of lattice patterns of the radial lattice 25 is given by N and the equi-angle pitch is given by $\Delta\phi$, then $p = \gamma\Delta\phi$ and $\Delta\phi = 2\pi/N$. Thus, $$F = 2mN\omega/90 \qquad (14)$$

When the number of waves of the output signals of the photosensing device in a time $\Delta t$ is given by n and the rotation angle $\theta$ of the radial lattice 25 in the time $\Delta t$ is given by $\theta$, then $n = F\Delta t$ and $\theta = \omega\Delta t$. Thus, $$n = 2mN\theta/\pi \qquad (15)$$

By counting the number of waves of the output signal of the photosensing device, the rotation angle $\theta$ of the radial lattice 25 can be determined in accordance with the formula (15). It is preferable if the direction of rotation is detected in detecting the rotation angle. To this end, in the present embodiment, as is known in the prior art photoelectric rotary encoder, a plurality of photosensing devices are arranged such that the phases of the signals are staggered by 90° from each other and a signal representing the direction of rotation is extracted from the 90° phase difference signals.

In the present embodiment, the 90° phase difference between the output signals of the photosensing devices 210 and 210' is created by the combination of the linear polarization of the laser, the quarter wavelength plates and the polarization plates. Since the laser is usually linearly polarized, the two quarter wavelength plates 27 and 27' are arranged at the angles of ±45° to the direction of polarization. Thus, the light beams transmitted through the quarter wavelength plates 27 and 27' are circularly polarized oppositely to each other, and when they are superimposed at the illumination position $M_2$, they are again linearly polarized. The direction of polarization varies with the rotation of the radial lattice 25. By staggering the directions of polarization of the polarization plates 29 and 29' arranged in front of the photosensing devices 210 and 210', the 90° phase difference is imparted to the output signals of the photosensing devices 210 and 210'. As shown in FIG. 1C, the outputs of the photosensing devices 210 and 210' are reshaped and the direction of rotation is detected, and then they are accumulated by a counter to determine the rotation angle.

In the prior art index scale type photoelectric rotary encoder, the relationship between the number n of waves of the output signal from the photosensing device, the total number N of the lattice patterns of the main scale and the rotation angle $\theta$ is given by $$n = N\theta/2\pi \quad (16)$$

Thus, the rotation angle $\Delta\theta$ per wave is given by $$\Delta\theta = 2\pi/N (radian) \quad (17)$$

On the other hand, in the present embodiment, $$\Delta\theta = \pi/2mN (radian) \quad (18)$$

as seen from the formula (15).

Accordingly, the present embodiment can detect the rotation angle at the precision which is 4 m times as high as that of the prior art with the same number of divisions of the scale.

The error due to the eccentricity is eliminated by the following principle.

Figure 3:
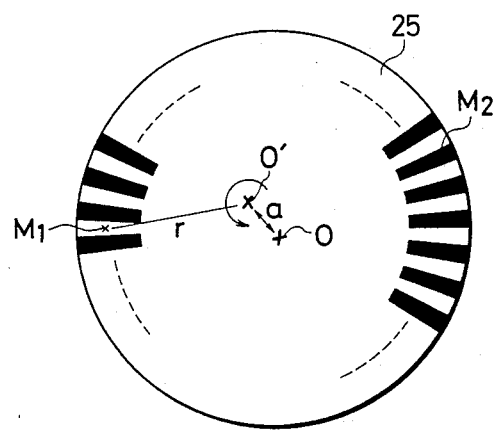
FIG. 3 shows an eccentricity between a center of a radial lattice and a center of rotation in the third and fourth embodiment.

FIG. 3 shows the illumination positions $M_1$ and $M_2$ of the light beams on the radial lattice 25 of FIG. 1C and an eccentricity between the center of the radial lattice 25 and the center of rotation of the rotating body under test.

In the third embodiment, two points $M_1$ and $M_2$ on the radial lattice 25 which are point-symmetric to the center of rotation are selected as the illumination positions or measurement positions to reduce the affect of the eccentricity between the center of the radial lattice 25 and the center of rotation of the rotating member under test. It is difficult to completely align the center of the radial lattice 25 to the center of rotation and the eccentricity therebetween is unavoidable. As shown in FIG. 3, if the eccentricity a exists between the center O of the radial lattice 25 and the center O' of rotation, the doppler frequency shift at the measurement position $M_1$ which is at a distant $\gamma$ from the center of rotation changes from $\gamma/(\gamma+a)$ to $\gamma/(\gamma-a)$. On the other hand, the frequency shift at the measurement position $M_2$ which is point-symmetric to the position $M_1$ with respect to the center of rotation changes from $\gamma/(\gamma-a)$ to $\gamma/(\gamma+a)$ as opposed to the change at the position $M_1$. Thus, by using the two measurement positions $M_1$ and $M_2$, the affect of the eccentricity is reduced and the rotation speed can be detected with a high precision.

Figure 1D:
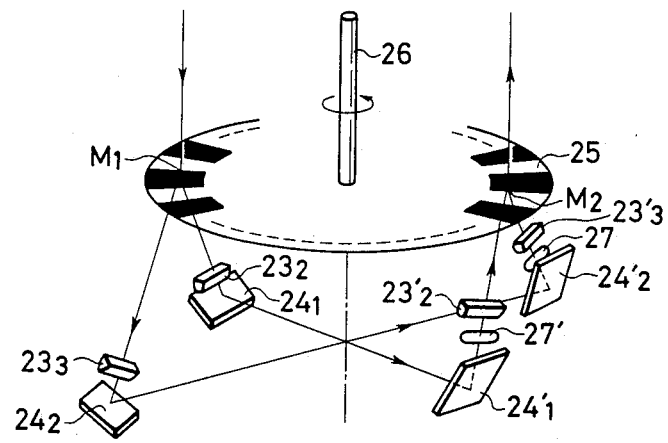

FIG. 1D shows a modification of the third embodiment of the present invention and shows the area of the radial lattice 25 of FIG. 1C to which the light beam is impinged the like numerals to those shown in FIG. 1C denote the like elements. The ±m-order transmitted diffraction lights of the light beam impinged to the radial lattice 25 at the position $M_1$ is directed to the position $M_2$ which is point-symmetric with respect to the center of the rotating shaft 6 through the cylindrical lenses $23_2$, $23_3$, $23_2'$ and $23_3'$ and the reflection mirrors $24_1$, $24_2$, $24_1'$ and $24_2'$.

FIG. 2D shows a modification of the embodiment of FIG. 2A done in the same manner as the modification of the third embodiment. Detail thereof is not explained because it is clear from the above description. In FIG. 2D, the like numerals to those shown in FIG. 2A and FIG. 1C denote the like elements. The fourth embodiment of FIG. 2D may also be modified in the manner shown in FIG. 1D.

As described above, by increasing the number of times of superposition of the diffraction lights by repeating the doppler shift effect, the detection precision increases by a factor of 2m×(number of times).

In the embodiments of the present invention described above, two ±m-order diffraction lights are used. Instead of the ±m-order diffraction lights, two diffraction lights having different numbers of order may be used. In this case, the angles $\theta m$ are different from each other.

In order to precisely detect the moving condition of the article, it is necessary to eliminate a variation of a center level of the output signal of the photosensing device due to an error of line width of the light transmission area and the light reflection area of the radial lattice or the variation of the output of the laser.

Figure 1E:
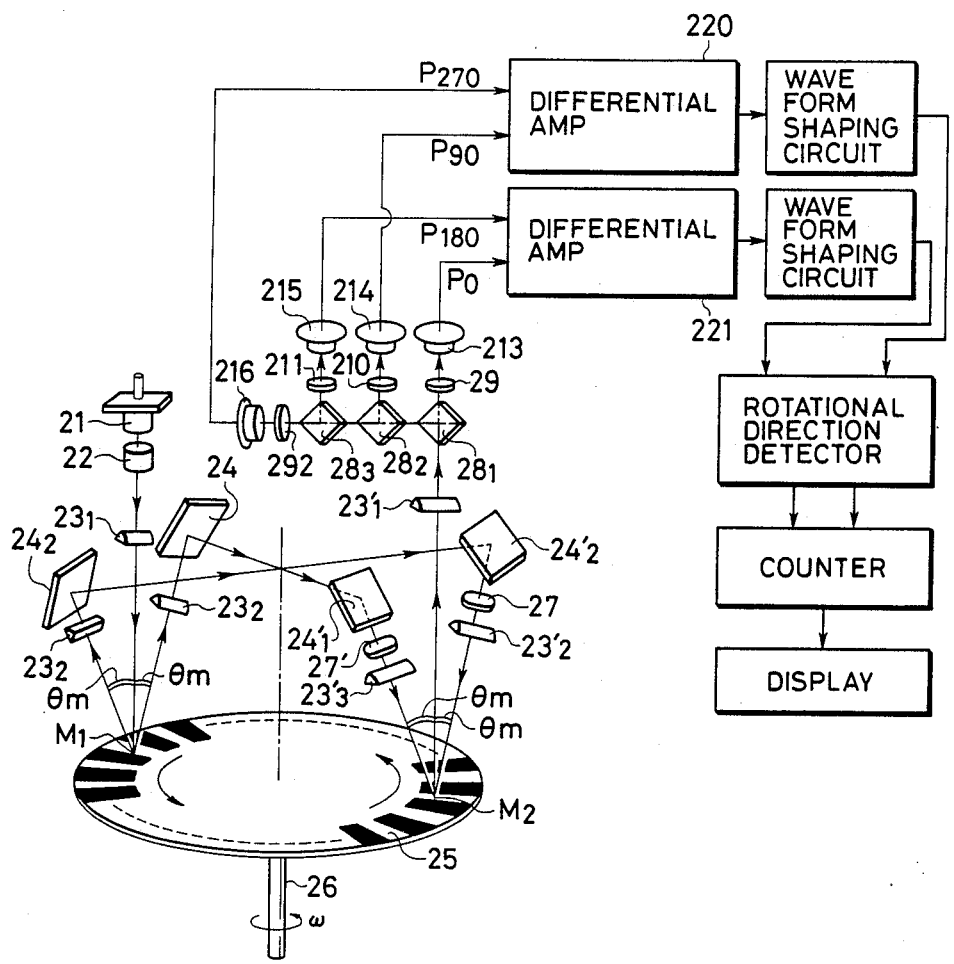

FIG. 1E shows a device which eliminates such error and variation.

In the fifth embodiment, in order to suppress the variation to keep the center level constant and stabilize the signal processing in the succeeding stage, a push-pull system is used to differentiate two output signals having a phase difference of 180° therebetween to eliminate a D.C. component.

In the fifth embodiment, the detector of the third embodiment is modified. In order to detect the direction of rotation and keep the center level of the signal constant, four phase difference signals of 0°, 90°, 180° and 270° are used as the output signals of the photosensing devices. Those four phase difference signals are produced by the combination of the linear polarization of the laser, two quarter wavelength plates 27 and 27' and four polarization plates 29, 210, 211 and 292. The laser is usually linearly polarized. The quarter wavelength plates 27 and 27' are arranged in the light paths of the ±m-order diffraction lights at axial angles of 45° and −45°. Thus, the light beams transmitted through the quarter wavelength plates 27 and 27' are circularly polarized oppositely to each other and they are superimposed at the illumination position $M_2$ as the ±m-order reflected diffraction lights and become linearly polarized lights. The direction of polarization varies with the rotation of the radial lattice 25. This light beam is divided into four light beams by the three beam splitters $28_1-28_3$ and they are directed to the photosensing devices 213–216 through the polarization plates 29, 210, 211 and 292 having their polarization directions staggered by 45° from each other. As the radial lattice 25 is rotated, the photosensing devices 213–216 produce the signals having a phase difference of 90° from each other.

When the phase of the output signal of the photosensing device 213 is 0°, the phases of the output signals of the photosensing devices 214, 215 and 216 are 90°, 180° and 270°, respectively. Those output signals are denoted by $P_0$, $P_{90}$, $P_{180}$ and $P_{270}$. The output signals $P_0$ and $P_{180}$, and $P_{90}$ and $P_{270}$ are applied to the differential amplifiers 220 and 221, respectively. The outputs of the differential amplifiers 220 and 221 have a phase difference of 90° therebetween, and they are free of D.C. component and have constant center levels. Those signals are reshaped and the direction of rotation is detected, and they are accumulated by a counter to determine the rotation angle.

The phase difference of 180° is created between the output signals of the photosensing devices 216 and 214, and 215 and 213 by the combination of the polarization plates 29, 210, 211 and 292 and the polarization beam splitters $28_1$, $28_2$ and $28_3$.

Figure 4A:
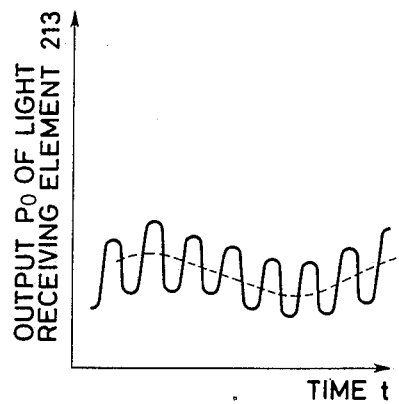
FIGS. 4A and 4B show waveforms of output signals of photosensing devices 213 and 215 in the fifth embodiment.
Figure 4B:
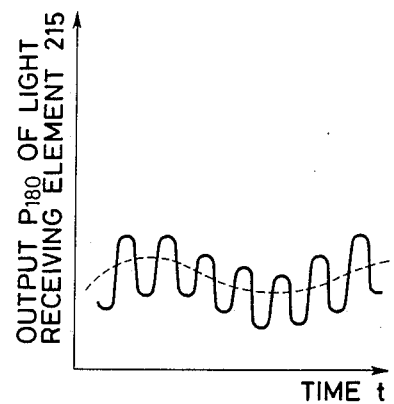
Figure 5:
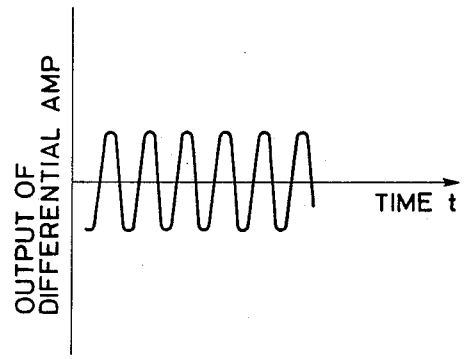
FIG. 5 shows a waveform of an output of a differential amplifier in the fifth embodiment.

The output $I_1$ of the photosensing device 213 at o a time t is given by $I_1 = a \sin 2\pi Ft + D(t)$, and the output $I_2$ of the photosensing device 215 is given by $I_2 = a \sin (2\pi FT + 180°) + D(t) = -a \sin 2\pi FT + D(t)$, where $D(t)$ is a D.C. variation of the output signal due to nonuniform line width of the light transmission area and the reflection area of the radial lattice 25. The output signals $P_0$ and $P_{180}$ of the photosensing devices 213 and 215 are differentially amplified by the differential amplifier which produces an output of $\beta(I_1-I_2) = 2a\beta \sin 2\pi Ft$, where $\beta$ is a gain of the differential amplifier. Thus, the D.C. component is eliminated and stable signal processing is attained. FIGS. 4A and 4B show the output waveforms of the photosensing devices 213 and 215, and FIG. 5 shows the output waveform of the differential amplifier.

By the use of the push-pull system, the D.C. variation of the output of the photosensing device due to the nonuniform line width of the reference radial lattice is eliminated and the rotary encoder capable of stably processing the signal is provided.

Figure 2E:
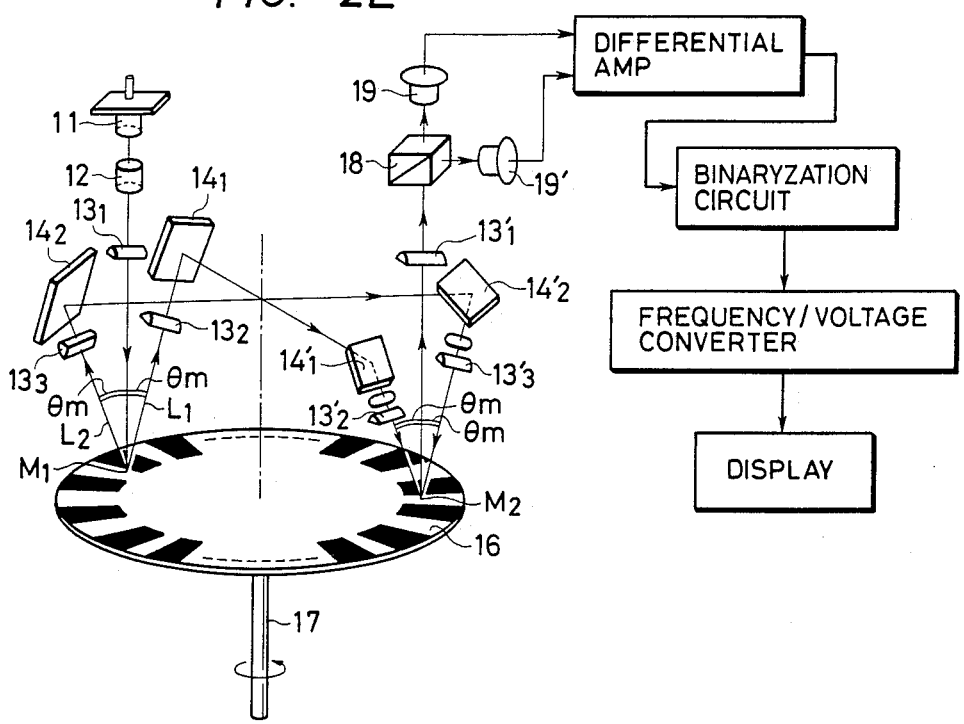

FIG. 2E shows a sixth embodiment in which the push-pull system is introduced to the fourth embodiment. In FIG. 2E, the like numerals to those shown in FIG. 2D denote the like elements.

The phase difference of 180° is created between the output signals of the photosensing devices 19 and 19' by the combination of the two quarter wavelength plates 17 and 17' and the polarization beam splitter 18. The output $I_1$ of the photosensing device 19 at a time t is given by $I_1 = a \sin 2\pi FT + D(t)$, and the output $I_2$ of the photosensing device 19' is given by $I_2 = a \sin (2\pi FT + 180°) + D(t) = -a \sin 2\pi Ft + D(t)$, where $D(t)$ is a D.C. variation of the output signal due to the nonuniform line width of the light transmission area and the reflection area of the radial lattice 15. As shown in FIG. 2E, the output signals of the photosensing devices 9 and 9' are differentially amplified by the differential amplifier, which produces an output of $\beta(I_1-I_2) = 2a\beta \sin 2\pi Ft$, where $\beta$ is a gain of the differential amplifier. Thus, the D.C. variation is eliminated and the stable signal processing is attained as shown in FIG. 2E, the output signal from the photosensing device 19 is binarized by a compurator and frequency-analyzed by a frequency-voltage converter and the result is displayed so that the frequency F is determined and the variation of the rotating speed of the rotating body is determined.

In the fifth and sixth embodiments, the phase difference of 180° is imparted between the output signals of the photosensing devices 9 and 9' by the combination of the two quarter wavelength plates and the polarization beam splitter, although other means may be used to impart the phase difference of 180°. For example, a combination of polarization plates oriented at +45° with respect to the direction of linear polarization of laser and a polarization beam splitter may be arranged in the light paths of the positive and negative diffraction lights. Instead of the polarization beam splitter, polarization plates oriented normally to each other may be arranged in front of the two photosensing devices as the beam splitter.

By the combination of the quarter wavelength plates and the polarization beam splitter, the D.C. variation of the output of the photosensing device due to the line width error of the reference radial lattice is eliminated and the stable signal processing is attained.

In the second, third, fourth and fifth embodiments, when the ±m-order diffraction lights are again impinged to the radial lattice 16 or 25 under the same condition at the conjugate positions, the spread of the light beam diameter due to the reduction of the focusing ability can be suppressed to effectively direct the light beam to the photosensing means in order to enhance the detection precision. This is explained with reference to seventh and eighth embodiments.

Figure 1F:
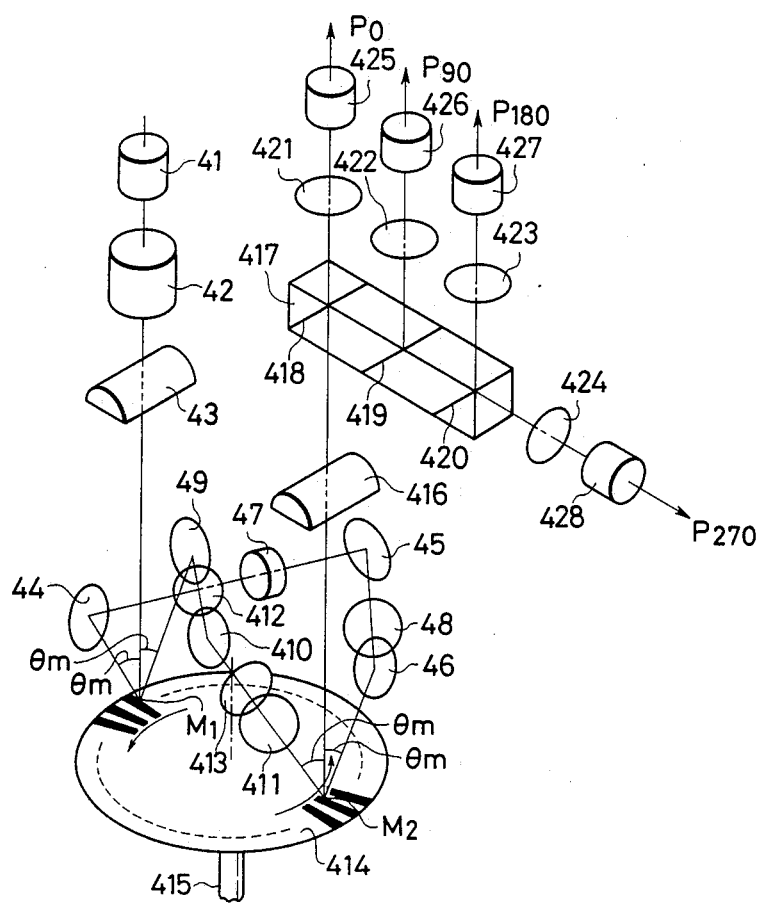

The seventh embodiment is a modification of the fifth embodiment shown in FIG. 1G, FIG. 1F shows the seventh embodiment. Numeral 41 denotes a light source such as a laser which emits a single wavelength, numeral 42 denotes a collimeter lens, numerals 43 and 416 denote cylindrical lenses, numerals 44, 45, 46, 49, 410 and 411 denote reflection mirrors, and numerals 47 and 412 denote focusing optical systems. The reflection mirrors 44, 45 and 46 and the focusing optical system 47 form a first relay optical system, and the reflection mirrors 49, 410 and 411 and the focusing optical system 412 form a second relay optical system. Numerals 48 and 413 denote quarter wavelength plates which are arranged at 45° and −45° relative to the linear polarization light from the laser 41. The two relay optical systems cross between the optical path of the reflection mirror 44 and the focusing optical system 47 and the optical path of the reflection mirror 49 and the focusing optical system 412. Numeral 414 denotes a radial lattice having a lattice pattern of light transmission areas and reflection areas arranged on a disk at an equi-angle, numeral 45 denotes a rotating shaft of the radial lattice 414 coupled to a rotating shaft of a rotating body under test, numeral 417 denotes a beam splitter having semi-transmissive planes 418, 419 and 420, numerals 421, 422, 423 and 424 denote polarization plates having their directions of polarization staggered by 45° from each other, and numerals 425, 426, 427 and 428 denote photosensing devices.

A characteristic of the present embodiment is the arrangement of the focusing optical systems 411 and 412 in the light paths between the diffraction points $M_1$ and $M_2$. Thus, the ±m-order diffraction lights can be again directed to the radial lattice under the same condition at the conjugate positions so that the reduction of the focusing ability is prevented and the light beam is efficiently directed to the photosensing means.

The focusing relation between the incident points $M_1$ and $M_2$ in the embodiment of FIG. 1F is explained.

The doppler shift of the light beam at the incident point $M_1$ is represented by $$\Delta f = \frac{1}{2\pi}(ks - ki) \cdot V$$

where denotes a vector inner product, ki is a vector of the number of waves of the incident light beam, ks is a vector of the number of waves of the reflected diffraction light and V is a velocity vector of the radial lattice, and $|ks| = |ki| = 2\pi/\lambda$.

FIG. 6A shows a vector of the doppler shift when the vector at the incident point $M_1$ is $(ks-ki)\cdot V>0$. In order for the diffraction light reflected at the incident point $M_1$ to be again subjected to the doppler shift at the incident point $M_2$ so that the total doppler shift of $2\Delta f$ is presented, $(ks'-ki')\cdot V>0$ must be met, where ki' and ks' are frequency vectors of the incident light beam and the reflected diffraction light at the incident point $M_2$. To this end, the vectors ki', ks' and V at the incident point $M_2$ must be those shown in FIG. 6B. The light beam reflected and diffracted at the incident point $M_1$ at the reflection angle of $\theta$ toward the direction of rotation of the radial lattice must be directed to the incident point $M_2$ at an incident angle of $\theta$ relative to the direction of rotation.

On the other hand, in order for a conjugate relationship to be met between the incident points $M_1$ and $M_2$, the shine proof law should be met.

The relay optical system which meets the above requirements is shown in FIG. 7 in which a band contained in a plane defined by the vector ks and the vector V at the incident point $M_1$ is twisted once before it impinges to the incident point $M_2$.

In the present embodiment, the relay optical system of FIG. 7 is achieved by at least three reflection mirrors and at least one focusing optical system.

Figure 2F:
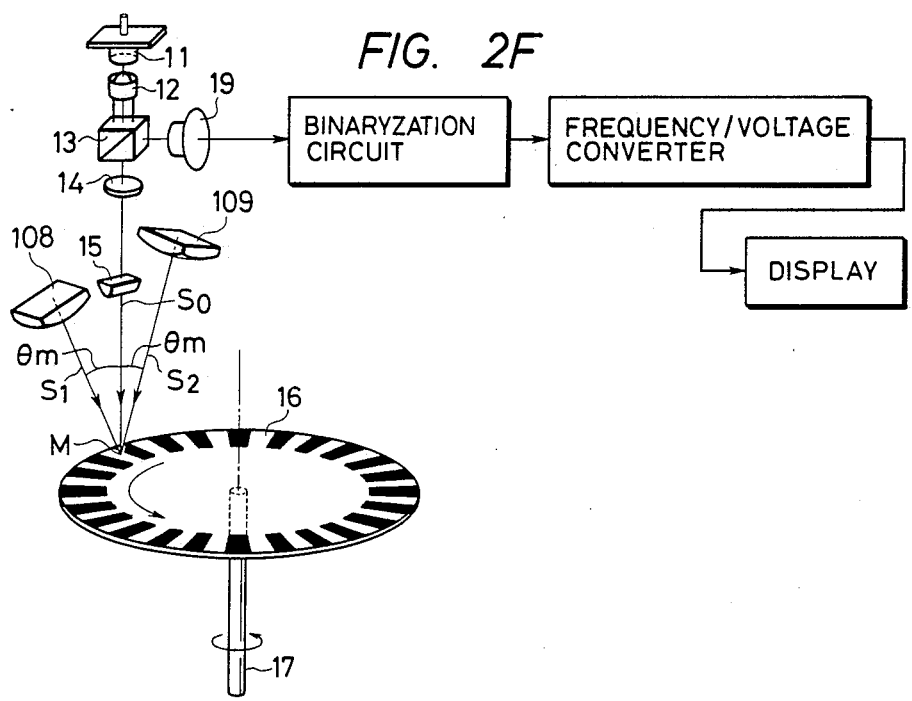

In an eighth embodiment of the present embodiment, the above focusing optical system is applied to the second embodiment. FIG. 2F shows the eighth embodiment. Numeral 11 denotes a light source such as a laser, numeral 12 denotes a collimeter lens, numeral 13 denotes a polarization beam splitter, numeral 14 denotes a quarter wavelength plate, numeral 15 denotes a cylindrical lens, numeral 16 denotes a radial lattice having light transmission areas and reflection areas arranged on a disk at an equi-angle, numeral 17 denotes a rotating shaft which is coupled to a rotating body under test, and numerals 18 and 19 denote optical means each comprising a positive diffraction power plane and a rear reflection mirror. A position M on the radial lattice 16 is conjugate with the original radial lattice.

Optical axes $S_1$ and $S_2$ of the optical means 108 and 109 lie in a plane defined by a tangential direction of the rotation of the radial lattice 16 and an optical axis $S_0$ of the illumination means including the collimater lens 12, and the optical axes $S_1$ and $S_2$ make an angle of $\theta m$ with the optical axis $S_0$ of the illumination means. The optical means 108 has such a diffraction power that a crosspoint M of the optical axis $S_1$ and the radial lattice 16 is again focused by the optical means 108 at the same point M at a unity magnification as a conjugate image. It may comprise a diffraction plane and a rear reflection plane. In this manner, the linear illumination image formed at the incident point M on the radial lattice 16 is refocused at the same point M on the radial lattice 16 by the optical means 108. The image focused by the optical means 108 meets the shine proof law. This is also true for the optical means 109.

In the present embodiment, the diffraction powers of the optical means 108 and 109 are selected such that the spread of the light beam diameter due to the reduction of the focusing ability when the $\pm m$-order diffraction lights are again impinged to the radial lattice 16 so that the light beams are efficiently directed to the photosensing means.

The $\pm m$-order diffraction lights returned to the original light paths by the optical means 108 and 109 are again refracted by the radial lattice 16 and the resulting $\pm m$-order diffraction light are superimposed and returned to the original light path.

The eighth embodiment may be modified in the same manner as the modification of the second embodiment (shown in FIGS. 2B and 2C).

Figure 2G:
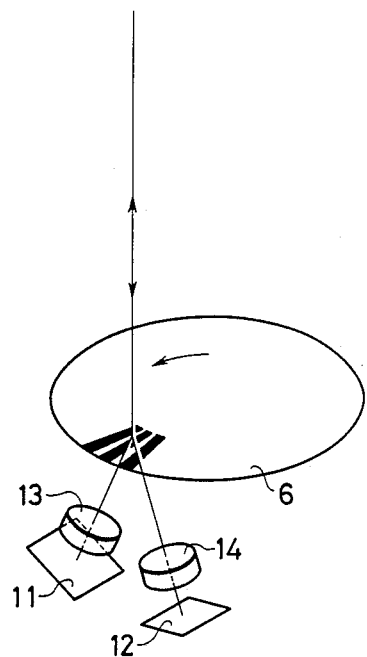
Figure 2H:
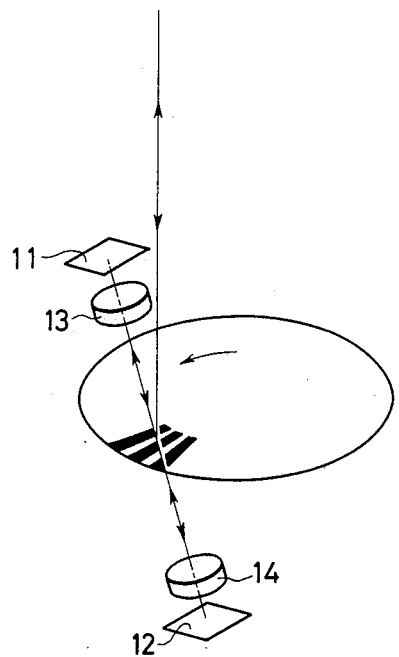

FIGS. 2G and 2H show modifications of the eighth embodiment. FIGS. 2G and 2H show the areas of the radial lattice 16 of FIG. 2F to which the light beam is impinged. The like numerals to those shown in FIG. 2F designate the like elements.

FIG. 2G show the eighth embodiment in which the $\pm m$-order transmitted diffraction lights impinged to the radial lattice 16 are utilized, and FIG. 2H show a modification in which the m-order transmitted diffraction light and the m-order reflected diffraction light of the light beam impinged to the radial lattice 16 are utilized. Both embodiments are basically identical to the embodiment of FIG. 2F except that the $\pm m$-order transmitted diffraction lights or the m-order transmitted diffraction light and the m-order reflected diffraction light are used instead of the $\pm m$-order reflected diffraction lights.

The above embodiments may be combined or the modifications may be applied to other embodiments. In the first, third, fifth and seventh embodiments, only the rotation angle may be detected. In this case, the quarter wavelength plate, polarization plate and beam splitter are not necessary and only one photosensing device is used.

In the above embodiments, the light source is not limited to the laser but any light source which emits a single wavelength may be used.

The third and fourth embodiments are compared with the prior art rotary encoder. In the prior art photoelectric rotary encoder, the width the light transmission area and the light blocking area is 10 $\mu$m at minimum, from the standpoint of the affect by the light diffraction.

If a rotation angle detection precision of 30 seconds is desired, the main scale in the prior art apparatus must be divided into $N=360\times60\times60/30=43,200$ areas, as seen from the formula (6). If the width of the light transmission area and the light blocking area in the outer periphery of the main scale is 10 $\mu$m, the diameter of the main scale must be 0.01 mm$\times43,200/\pi=137.5$ mm. In the present embodiment, the number of areas of the radial lattice may be $\frac{1}{m}$ of that of the prior art in order to obtain the same rotation angle detection precision. When $m=1$ ($\pm1$-order diffraction lights), the number of areas of the radial lattice 14 may be $43,200/4=10,800$ to attain the rotation angle detection precision of 30 seconds. In the present embodiment, since the diffraction lights of the laser are used, the width of the light transmission area and the reflection area may be narrower, for example, 4 $\mu$m. Thus, the diameter of the radial lattice is 0.004 mm$\times10,800/\pi=13.75$ mm. Thus, the size of the present embodiment may be less than one tenth of that of the prior art index scale type photoelectric rotary encoder to attain the same rotation angle detection precision. As a result, the load to the rotating body is much smaller than that in the prior art apparatus and the precise measurement is achieved.

What I claim is:

1. A rotating condition detection apparatus, comprising:
    optical means for directing a laser beam to a diffraction grating formed on a rotating body along a rotary direction thereof, said optical means linearly illuminating said diffraction grating with said laser beam in a direction of said rotating body;
    light receiving means for photoelectrically converting an interference light formed by diffracted lights of predetermined orders emitting from said diffraction grating; and
    detecting means for detecting a rotating condition of the rotating body on the basis of a signal from said light receiving means.

2. A rotating condition detecting apparatus according to claim 1 wherein said detecting means comprises means for counting the rotational speed of the rotating body.

3. A rotating condition detection apparatus according to claim 2, wherein said detecting means comprises means for discriminating a rotational direction of the rotating body.

4. A rotating condition detection apparatus, comprising:
    first optical means for directing a laser beam to a first position of a diffraction grating formed on a rotating body along a rotary direction thereof;
    second optical means for projecting diffracted lights of ±m-order emitting from said first position to a second position of said diffraction grating different from said first position and making a re-diffracted light of ±m-order obtained by diffracting said diffracted light of ±m-order and a re-diffracted light of −m-order obtained by diffracting said diffracted light of −m-order emitted from said second position in substantially the same direction;
    light receiving means for photoelectrically converting an interference light formed by said re-diffracted lights of ±m-order; and
    detecting means for detecting a rotating condition of the rotating body on the basis of a signal from said light receiving means.

5. A rotating condition detection apparatus according to claim 4, wherein the distance between said first position and the rotational center of the rotating body is approximately equal to the distance between said second position and the rotational center of the rotating body.

6. A rotating condition detection apparatus according to claim 5, wherein the rotational center of the rotating body is on a line extending from said first position to said second position.

7. A method for detecting a rotating condition of a rotating body having a diffraction grating marked along a rotating direction thereof, said method comprising the steps of;
    linearly illuminating said diffraction grating in a direction substantially perpendicular to a radial direction of said rotating body with a predetermined laser beam; and
    photoelectrically converting an interference light obtained by superimposing diffraction lights, created at the diffraction grating, having respective predetermined order numbers so as to detect the rotating condition of the rotating body.

8. A method according to claim 7 wherein said illuminating step includes a step of preparing a laser, and a step of directing light from the laser to a cylindrical lens.

9. A method according to claim 8 wherein said illuminating step further includes a step of re-directing the diffraction lights created at the diffraction grating back to the diffraction grating, and the superimposed diffraction lights in said converting step are those which are re-diffracted by the diffraction grating.

10. A method according to claim 9 wherein said illuminating step is conducted by using a single linear coherent light.

11. A method according to claim 10 wherein the position of the diffraction grating to which each of the diffraction lights is re-directed is different from a position where said diffraction lights are created.

12. A method according to claim 10 wherein the position of the diffraction grating to which each of the diffraction lights is re-directed in the same position where said diffraction lights are created.

13. A method according to claim 7 wherein the amount of rotation or the speed of rotation of the rotating body is detected based on a signal obtained in said photoelectric converting step.

14. A method according to claim 4 wherein said illuminating step includes a step of preparing a laser, a step of dividing light from the laser into two light beams and a step of directing said two light beams to respective cylindrical lenses, and the diffraction grating is irradiated with two linear coherent lights.

15. A method for detecting a rotating condition of a rotating body having a rotational center and a diffraction grating marked along a rotating direction thereof, said method comprising the steps of:
    directing a laser beam to a first position of the diffraction grating;
    projecting diffracted lights of ±m-order emitting from said first position to a second position of said diffraction grating different from said first position and making a re-diffracted light of ±m-order obtained by diffracting said diffracted light of ±m-order and a re-diffracted light of −m-order obtained by diffracting said diffracted light of −m-order emitted from said second position in substantially the same direction; and
    photoelectrically converting an interference light formed by said re-diffracted lights of ±m-order.

16. A method according to claim 15 wherein the rotational center of the rotating body is on an axis extending from said first position to said second position.

17. A method according to claim 16 wherein the distance between said first position and the rotational center of the rotating body is substantially equal to the distance between said second position and the rotational center of the rotating body.

18. A method according to claim 17 wherein said projection step is performed through an optical system which makes said first position conjugate with said second position.

19. A method according to claim 15 wherein all of said first and second re-diffracted lights of ±m-order are reflected diffraction lights.

20. A method according to claim 15 wherein said directing step includes a step of preparing a laser and a step of directing light from said laser to a cylindrical lens, and said diffraction grating is linearly illuminated in a direction substantially perpendicular to a radial direction of said rotating body with said light beam.

21. A method according to claim 15 wherein the amount of rotation or the speed of rotation of the rotating body is detected based on a signal obtained in said photoelectric converting step.

22. A method for detecting a rotating condition of a rotating body having a rotational center and a diffraction grating marked along a rotating direction thereof, said method comprising the steps of:
   directing a laser beam to a first position of the diffraction grating;
   projecting first and second diffraction lights, created at said first position, having respective predetermined order numbers onto a second position of the diffraction grating through an optical system which makes said first position conjugates with said second position; and
   photoelectrically converting an interference light obtained by superimposing third and fourth diffraction lights created at said second position of the diffraction grating so as to detect the rotating condition of the rotating body.

23. A method according to claim 22 wherein said first and second positions are the same.

24. A method according to cl aim 23 wherein said directing step includes a step of preparing a laser and a step of directing light from said laser to a cylindrical lens, and said first position is linearly illuminated in a direction substantially perpendicular to a radial direction of said rotating body with the light beam.

25. A method according to cl aim 22 wherein said first position is symmetrical with said second position about the rotational center of the rotating body.

26. A method according to claim 25 wherein said directing step includes a step of preparing a laser and a step of directing light from said laser to a cylindrical lens, and said first position is linearly illuminated in a direction substantially perpendicular to a radial direction of said rotating body with the light beam.

27. A method according to claim 22 wherein the amount of rotation or the speed of rotation of the rotating body is detected based on a signal obtained in said photoelectric step.

28. A method for detecting a rotating condition of a rotating body comprising the steps of:
   forming a diffraction grating on the rotating body along a rotational direction of the rotating body,
   directing a laser beam to the diffraction grating;
   re-directing first and second diffracted lights emitting from said diffraction grating to said diffraction grating through an optical means, said optical means being formed so that emitting positions of said first and second diffracted lights emitting from said diffraction grating and entering positions of said first and second diffracted lights entering into said diffraction grating are conjugate; and
   photoelectrically converting an interference light obtained by superimposing third and fourth diffraction lights created in said re-directing step so as to detect the rotating condition of the rotating body.

29. A method according to claim 28 wherein said re-directing step is performed through first and second reflection optical systems provided and corresponding to said first and second diffraction lights, respectively.

30. A method according to claim 28 wherein the amount of rotation or the speed of rotation of the rotating body is detected based on a signal obtained in said photoelectric converting step.

31. A method according to claim 19, wherein the orders of said diffracted and re-diffracted lights are ±1.

32. A method according to claim 28, wherein said diffraction grating is linearly illuminated in a direction substantially perpendicular to a radial direction of said rotating body with said light beam in said directing step.

33. A method for detecting a rotating state of a rotating body on which a diffraction grating is formed along a rotary direction thereof, comprising the steps of:
   linearly illuminating the diffraction grating with a radiation beam emitted in a direction substantially perpendicular to a radial direction of the rotating body;
   forming an interference light beam by superimposing first and second diffracted light beams created at the diffraction grating; and
   detecting the rotating state of the rotating body on the basis of the interference light beam.

34. A method for detecting a rotating state of a rotating body on which a diffraction grating is formed along a rotary direction thereof, comprising the steps of:
   illuminating a predetermined position of the diffraction grating with a laser beam;
   directing diffracted light beams of ±m-order created at the predetermined position to another position of the diffraction grating different from the predetermined position;
   forming an interference light beam by superimposing a rediffracted light beam of ±m-order produced by diffracting the diffracted light beam of ±m-order and a rediffracted light beam of −m-order produced by diffracting the diffracted light beam of −m-order emitting from the another position; and
   detecting the rotating state of the rotating body on the basis of the interference light beam.

35. A method according to claim 34, wherein diffracted light beams are directed to the predetermined position and the another position which are symmetrical to each other with respect to the center of rotation of the rotating body.

36. A method for detecting a rotating state of a rotating body on which a diffraction grating is formed along a rotary direction thereof, comprising the steps of:
   illuminating a predetermined position of the diffraction grating with a laser beam;
   directing first and second diffracted light beams created at the predetermined position to another position of the diffraction grating different from the predetermined position, wherein the predetermined position and the another position are optically conjugate to each other;
   forming an interference light beam by superimposing first and second re-diffracted light beams emitting from the another position; and
   detecting the rotating state of the rotating body on the basis of the interference light beam.

37. A method according to claim 36, wherein the diffracted light beams are directed to the predetermined position and the another position, with the positions being symmetrical to each other with respect to the center of rotation of said rotating body.

38. A method according to claim 36, wherein the first and second diffraction light beams are a +1 order number and −1 order number, respectively, and the first rediffraction light beam is +1 order number produced by diffracting the first diffraction light beam, and the second rediffracton light beam is a −1 order number produced by diffracting the second diffraction light beam.

39. A rotation condition detecting apparatus comprising:
  optical means for directing a radiation beam to a diffraction grating formed on a rotating body along a rotary direction thereof, said optical means illuminating the diffracting grating with the radiation beam in a direction substantially perpendicular to a radial direction of the rotating body, with the radiation beam having a long and narrow shape in the rotary direction;
  light receiving means for photoelectrically converting an interference fringe formed by diffracted lights of predetermined orders emitting from the diffraction grating; and
  detecting means for detecting a rotating condition of the rotating body on the basis of a signal from said light receiving means.

40. A rotating condition detection apparatus comprising:
  first optical means for directing a radiation beam to a first position of a diffraction grating formed on a rotating body along a rotary direction thereof;
  second optical means, including total reflection mirror members arranged so that an incident optical path and a reflection optical path are different from each other, for projecting diffracted lights of ±m-order emitting from said first position to a second position of the diffraction grating different from said first position and making a re-diffracted light of ±m-order obtained by diffracting said diffracted light of ±m-order and a re-diffracting light of −m-order obtained by diffracting said diffracted light of −m-order emitted from said second position in substantially the same direction;
  light receiving means for photoelectrically converting an interference light formed by said re-diffracted lights of ±m-order; and
  detecting means for detecting a rotating condition of the rotating body on the basis of a signal from said light receiving means.

41. A rotating condition detecting apparatus according to claim 40, wherein said first and second optical means illuminates the diffraction grating with the radiation beam in a direction substantially perpendicular to a radial direction of the rotating body, with the radiation beam having a long and narrow shape in the rotary direction.

42. A rotating condition detecting apparatus according to claim 40, wherein the distance between said first position and the rotational center of the rotating body is approximately equal to the distance between said second position and the rotational center of the rotating body.

43. A rotating condition detecting apparatus according to claim 42, wherein the rotational center of the rotating body is on a line extending from said first position to said second position.

44. A method for detecting a rotating state of a rotating body on which a diffraction grating is formed along a rotary direction thereof, comprising the steps of:
  illuminating a predetermined position of the diffraction grating with a radiation beam;
  directing first and second diffracted light beams created at said predetermined position to another position on the diffraction grating different from said predetermined position by total reflection mirror members arranged so that an incident optical path and a reflection optical path are different from each other, wherein said predetermined position and the another position are optically conjugate to each other;
  forming an interference light beam by superimposing first and second re-diffracted light beams emitting from the another position; and
  detecting the rotating state of the rotating body on the basis of the interference radiation beam.

* * * * *

UNITED STATES PATENT AND TRADEMARK OFFICE
CERTIFICATE OF CORRECTION

PATENT NO. : 4,967,072

DATED : October 30, 1990

INVENTOR(S) : Tetsuharu Nishimura

It is certified that error appears in the above-identified patent and that said Letters Patent is hereby corrected as shown below:

COLUMN 2:

Line 51, "refraction lights;" should read
--diffraction lights;--.

COLUMN 3:

Line 17, "collimeter lens," should read
--collimater lens,--.

Line 31, "collimeter lens 2" should read
--collimater lens 2--.

COLUMN 4:

Line 20, "p=$\Delta\phi$" should read --p=$\gamma\Delta\phi$--.

Line 24, "diffracted" (first occurrence) should
read --reflected--.

Line 56, "45°." should read --±45°.--.

UNITED STATES PATENT AND TRADEMARK OFFICE
CERTIFICATE OF CORRECTION

PATENT NO. : 4,967,072

DATED : October 30, 1990

INVENTOR(S) : Tetsuharu Nishimura

It is certified that error appears in the above-identified patent and that said Letters Patent is hereby corrected as shown below:

COLUMN 5:

Line 39, "collimeter lens," should read --collimater lens,--.

Line 49, "collimeter lens 12," should read --collimater lens 12,--.

COLUMN 6:

Line 1, "diffraction refraction lights $L_1$ and $L_2$" should read --reflected diffraction lights $L_1$ and $L_2$--.

Line 41, "$v = \gamma f$," should read --$v = \gamma \omega$,--.

Line 42, "$p = \gamma \Delta \phi$" should read --$p = \gamma \Delta \phi$--.

COLUMN 7:

Line 37, "collimeter lens," should read --collimater lens,--.

COLUMN 8:

Line 46, "$F = 2mN\omega/90$" should read --$F = 2m\omega/\pi$--.

UNITED STATES PATENT AND TRADEMARK OFFICE
CERTIFICATE OF CORRECTION

PATENT NO. : 4,967,072

DATED : October 30, 1990

INVENTOR(S) : Tetsuharu Nishimura

It is certified that error appears in the above-identified patent and that said Letters Patent is hereby corrected as shown below:

COLUMN 11:

Line 62, "compurator" should read --comparator--.

COLUMN 12:

Line 4, "+45°" should read --±45°--.

COLUMN 13:

Line 5, "where denotes" should read --where · denotes--.

Line 39, "collimeter lens," should read --collimater lens,--.

COLUMN 15:

Line 10, "direction of" should read --direction substantially perpendicular to a radial direction of--.

Line 35, "±m-order" should read --+m-order--.

Line 36, "±m-order" should read --+m-order--.

UNITED STATES PATENT AND TRADEMARK OFFICE
CERTIFICATE OF CORRECTION

PATENT NO. : 4,967,072
DATED : October 30, 1990
INVENTOR(S) : Tetsuharu Nishimura It is certified that error appears in the above-identified patent and that said Letters Patent is hereby corrected as shown below:

COLUMN 16:

Line 26, "claim 4" should read --claim 7--.

Line 42, "±m-order" should read --+m-order--.

Line 43, "±m-" should read --+m- --.

COLUMN 18:

Line 31, "±m-order" should read --+m-order--.

Line 32, "±m-" should read --+m- --.

COLUMN 19:

Line 38, "±m-order" should read --+m-order--.

Line 39, "±m-order" should read --+m-order--.

Signed and Sealed this

Eighteenth Day of August, 1992

Attest:

DOUGLAS B. COMER

*Attesting Officer*     Acting Commissioner of Patents and Trademarks